May 29, 1923.
C. FREGONARA
1,457,059
SAFETY DEVICE FOR GAS WELDING PLANTS
Filed July 9, 1920
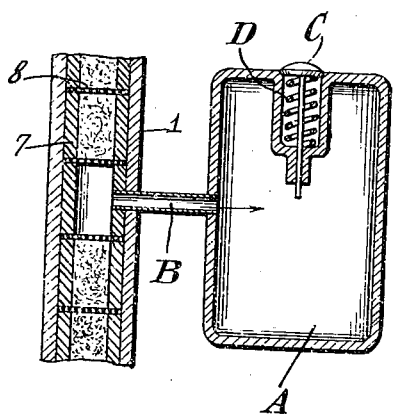
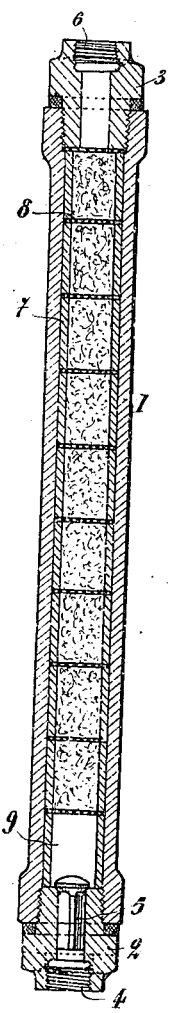
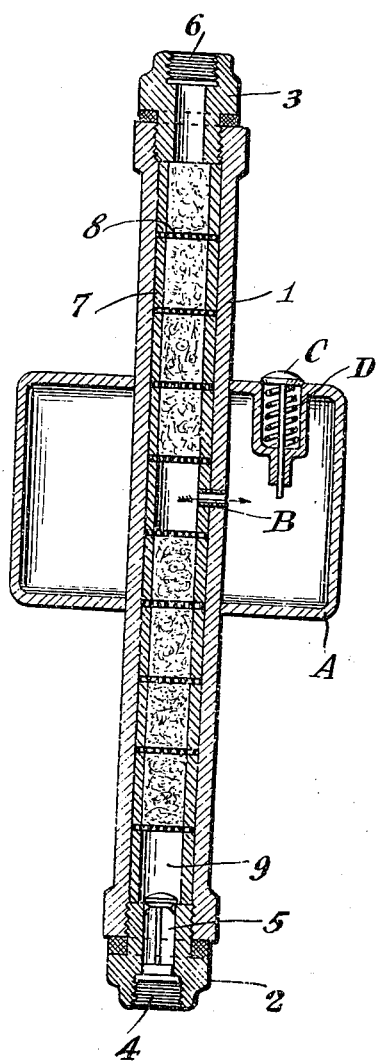
INVENTOR:
CHARLES FREGONARA.
by
Lacey & Lacey, his ATTORNEYS.

Patented May 29, 1923.

1,457,059

UNITED STATES PATENT OFFICE.

CHARLES FREGONARA, OF LYON, FRANCE.

SAFETY DEVICE FOR GAS WELDING PLANTS.

Application filed July 9, 1920. Serial No. 395,085.

*To all whom it may concern:*

Be it known that I, CHARLES FREGONARA, a subject of the King of Italy, and resident of Lyon, No. 24 Rue Lanterne, France, have invented certain new and useful Improvements in Safety Devices for Gas Welding Plants, of which the following is a specification.

The present invention has for its object a device for preventing an eventual flowing back of the flame towards the gas tank in the welding devices.

The novel device consists in a tubular filter of convenient length formed by means of a series of wire gauze discs between which are inserted iron chips; this filter is inserted in the pipe through which the combustible gas, such as acetylene for instance, is forwarded from the generator or from a vessel containing the gas under pressure, to the blow pipe.

In the accompanying drawings, Fig. 1 is an axial sectional view through one form of the safety device embodying the present invention;

Fig. 2 is a similar view illustrating a modification;

Fig. 3 is a similar view illustrating a further modification.

A pipe 1 is provided at both open ends with threaded plugs 2 and 3. Plug 2 is provided with a threaded portion 4 receiving the correspondingly threaded end of the gas tube (acetylene for instance) and a valve 5 opening towards the filter under the pressure of the inflowing gas. Said valve is preferably made of light metal such as aluminium and disposed in such a manner that its weight has a tendency for pressing it upon the seat, whereby any spring may be dispensed with. However such springs are not necessarily excluded from the device according to the invention.

Plug 3 is threaded at 6 for receiving the correspondingly threaded end of the pipe leading to the blow pipe. Between the plugs 2 and 3 a plurality of rings 7 are slidably engaged within pipe 1, the plugs press such rings 7 upon foraminous discs 8 made of wire gauze and interposed between the rings, the empty spaces between said discs being filled with iron chips or any like permeable material. The lower space 9 is left empty for allowing the displacements of valve 5.

The safety provided by the use of the filtering material is completed by the tightness of the valve 5.

Furthermore a chamber A may be disposed around the pipe, towards the middle of the latter, as shown in Fig. 2, or laterally as shown in Fig. 3, a connection being established between said chamber and the inner space of one of the rings 7 not containing chips. Said chamber is provided with a safety valve C held to its seat by a spring D and opening towards the outer air in the event of an explosion at the blow pipe. Owing to this arrangement at the middle of the filter pipe, the danger of propagating of an explosion in the remaining part of the filter is avoided.

A varying number of discs 8 may be used; the filtering pipe may be provided or not with a valve 5; chips only, without discs and wire gauze, may be used, except the lowermost disc forming the top of chamber 9.

The whole of the chips, discs and rings may be omitted, the valve 5, with or without a spring, forming the only safety device.

The washers 8 may be fixed to the rings 7 or perforated cups may be used instead of discs.

The constructive form shown in the drawing may be readily disassembled and the filtering material may be readily and quickly removed and renewed.

According to well known arrangements, the tube leading the gas to the blow pipe is curved so as to form one or more loops in order to check the propagating of the flame within the duct.

Having now fully described my said invention, what I claim and desire to secure by Letters Patent, is:

1. A safety device for gas welding plants comprising a pipe, means at the opposite ends of the pipe for the attachment of the gas lines comprising plugs fitted into the ends of the pipe, a plurality of tubular members fitted into the pipe and confined between the inner ends of the plugs, foraminous disc disposed at their peripheries between the adjacent ends of adjacent ones of said tubular members, and thus retained in place and forming a series of compartments extending longitudinally of the pipe, and a filling within each compartment.

2. A safety device for gas welding plants comprising a pipe, means at the opposite ends of the pipe for the attachment of the gas lines comprising plugs fitted into the ends of the pipe, a plurality of tubular members fitted into the pipe and confined between the inner ends of the plugs, foraminous discs disposed at their peripheries between the adjacent ends of adjacent ones of said tubular members and thus retained in place and forming a series of compartments extending longitudinally of the pipe, a casing disposed in juxtaposition to the pipe and in communication with an intermediate one of said compartments, a casing having a vent, and a check valve normally closing the vent.

In testimony whereof I have hereunto set my hand in presence of two witnesses.

CHARLES FREGONARA.

Witnesses:
  JULIAN KEMBLE SWEDBERG,
  JULIAN TELLONGER.